United States Patent
Garcia-Martin et al.

(10) Patent No.: US 7,054,326 B1
(45) Date of Patent: May 30, 2006

(54) METHOD AND APPARATUS FOR A SIGNALLING MESSAGE TRANSPORT MECHANISM

(75) Inventors: Miguel-Angel Garcia-Martin, Madrid (ES); Juan María Garcia Gonzalez, Madrid (ES)

(73) Assignee: Telefonakitebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/857,047

(22) PCT Filed: Dec. 3, 1999

(86) PCT No.: PCT/EP99/09439

§ 371 (c)(1),
(2), (4) Date: Aug. 30, 2001

(87) PCT Pub. No.: WO00/35205

PCT Pub. Date: Jun. 15, 2000

(30) Foreign Application Priority Data

Dec. 4, 1998 (FI) ....................... 982620

(51) Int. Cl.
*H04L 12/56* (2006.01)

(52) U.S. Cl. .................................... 370/410

(58) Field of Classification Search ........ 370/389–392, 370/395.3, 400, 410–465, 469–471, 475, 370/479, 496, 903, 467, 522, 524, 527, 528, 370/529; 379/229
See application file for complete search history.

(56) References Cited

U.S. PATENT DOCUMENTS

| | | | |
|---|---|---|---|
| 5,732,213 A * | 3/1998 | Gessel et al. ............. | 709/224 |
| 5,923,659 A | 7/1999 | Curry et al. | |
| 6,178,181 B1 * | 1/2001 | Glitho ................... | 370/467 |
| 6,324,183 B1 * | 11/2001 | Miller et al. ............ | 370/467 |
| 6,411,632 B1 * | 6/2002 | Lindgren et al. ......... | 370/466 |
| 6,614,781 B1 * | 9/2003 | Elliott et al. ............ | 370/352 |
| 6,831,914 B1 * | 12/2004 | Wheeler et al. .......... | 370/352 |

FOREIGN PATENT DOCUMENTS

| | | |
|---|---|---|
| WO | WO97/42774 | 11/1997 |
| WO | WO99/14910 | 3/1999 |
| WO | WO99/29124 | 6/1999 |
| WO | WO99/34620 | 7/1999 |

OTHER PUBLICATIONS

M. Sevcik, E. Lueder, "Customers in Driver's Seat: Private Intelligent Network Control Point", Proceedings of the International Switching Symposium, DE, Berlin, VDE Verlag, vol. SYMP. 15, 1995, pp. 41-44, XP000495622 ISBN: 3-8007-2093-0.

* cited by examiner

Primary Examiner—Kwang Bin Yao (57) ABSTRACT

A method of transmitting signalling information in a telecommunications network between peer user/application parts. Signalling information is transferred from a first user/application part to a Message Transfer Part (MTP) level 3, the information including a destination signalling point identifier identifying the signalling point at which the peer user/application part is located. The MTP level 3 determines from the destination signalling point identifier, a destination address suitable for conveying the signalling information to the destination signalling point. In the event that the destination address is an Internet Protocol (IP) address and Port number, the signalling information and the determined IP address and port number are transferred to an IP part for transmission over an IP network to the destination signalling point.

10 Claims, 5 Drawing Sheets

METHOD AND APPARATUS FOR A SIGNALLING MESSAGE TRANSPORT MECHANISM

FIELD OF THE INVENTION

The present invention relates to a transport mechanism for signalling messages in a communications network and more particularly, though not necessarily, to a transport mechanism for signalling messages which are traditionally carried by a Signalling System No. 7 based network.

BACKGROUND TO THE INVENTION

In a telecommunications system, signalling equipment and signalling channels are required for the exchange of information between system nodes. In particular, this inter-node signalling informs traffic channel switches of what is to be performed when a telephone or data call is to be set up or released in so-called "circuit-switched" connections. Signalling is also used to query centrally located databases, e.g. to obtain routing information for 800 numbers and to determine the location of a subscriber in a Public Land Mobile Network (PLMN).

Modern telecommunications systems now largely make use of Common Channel Signalling (CCS) whereby signalling information is transmitted on one or more dedicated signalling channels, distinct from the channels used to carry actual user information (e.g. voice or data). An important feature of CCS is that the same signalling system may support services in a variety of existing telecommunications protocols, e.g. Public Switched Telephone Network (PSTN), Integrated Services Digital Network (ISDN), and Public Land Mobile Networks (PLMN), as well as proposed future protocols such as B-ISDN, enhancing greatly the interoperability of networks supporting different protocols.

Currently, the predominant CCS is known as Signalling System Number 7 (SS7), defined in the ITU-T (International Telecommunications Union—Telecommunications section) recommendations starting with Q.700, and by ANSI (American National Standards Institute) in recommendations T1.111. SS7 is a packet switched system having multiple signalling links of one time slot in a Time Division Multiple Access (TDMA) E.1 or T.1 transmission format (the other time slots being available for user data). Individual signalling message packets (datagrams) are associated with respective individual telephone calls. As only a relatively small amount of signalling information is associated with a single telephone call, a single SS7 channel is able to handle all signalling between two network nodes (termed "signalling points") for several thousands of calls.

Figure 1:
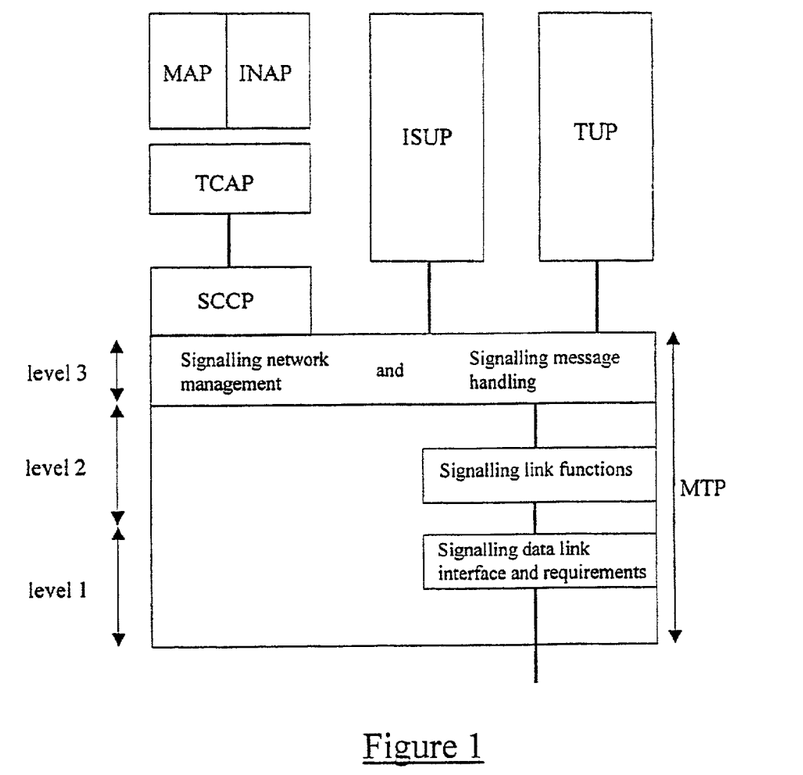
FIG. 1 shows schematically the protocol levels in an SS7 protocol stack.

As already alluded to above, SS7 is able to provide a signalling message transport mechanism for a number of different applications. FIG. 1 illustrates an SS7 protocol stack of which the lowest level, Message Transfer Part (MTP) level 1, defines the physical, electrical, and functional characteristics of a digital signalling link. MTP level 1 has a number of different possible forms including the European standard E.1 (2048 kb/s and 32 64 kb/s channels). MTP level 2 takes care of the accurate end-to-end transmission of messages across a chosen signalling link whilst MTP level 3 handles the routing of signalling messages between neighbouring signalling links based upon information received from higher SS7 levels concerning the final destination of a signalling message. MTP level 3 handles inter alia re-routing of messages away from failed or congested signalling links.

Above the MTP levels, SS7 comprises an ISDN User Part (ISUP) which defines the protocol and procedures involved in setting-up, controlling, and tearing-down circuit switched connections which carry voice and data over the Public Switched Telephone Network (PSTN). ISUP is not only used in ISDN networks, but is also employed in non-ISDN networks. A Telephone User Part (TUP) supports basic call processing for analogue calls and is used for example in China.

With the development of advanced network functions such as freephone (800 numbers), call forwarding, mobile roaming, etc, it has been necessary to add to SS7 a number of additional levels to support these functions. In particular SS7 is now provided with a Signalling Connection Control Part (SCCP) which handles the routing of signalling messages to and from the numerous applications which use the SS7 transport mechanism. SCCP also provides for the transformation of a Global Title (e.g. a dialled 800 number) into a destination signalling point (in Europe a signalling point is defined by a combination of a Network Indicator and a Signalling Point Code).

Located above the SCCP is a Transaction Capabilities Application Part (TCAP) which is a protocol for dealing with the exchange of information between signalling points related to database queries. For example, a switch within a network may use TCAP to determine the B-number associated with a dialled 800 number. This may require the sending of a suitable TCAP message to a database associated with the 800 number, with the SCCP performing the identification of signalling point at which the database is located.

The applications which make use of TCAP, and by extension SCCP, are many. For example the Mobile Application Part (MAP) is used in PLMNs to transfer information between Mobile Switching Centres (MSCs), Home Location Registers (HLRs), and Visitor Location Registers (VLRs), whilst the Intelligent Network Application Part (INAP) is used to transfer information between intelligent network nodes and telephone switches.

It will be appreciated that SS7 has evolved into a complex and hence computationally intensive set of protocols. There therefore exists, a desire to both reduce this complexity and also to reduce the high costs of signalling networks (both in terms of infrastructure and of maintenance). Telecommunications network designers have turned for an answer to the field of data networks and in particular to Internet Protocol (IP) networks where high demand has lead to relatively low cost and technically advanced solutions.

Several proposals have been put forward to employ IP networks in telecommunications signalling. For example, it has been proposed to encapsulate TCAP messages into IP datagrams for transmission over an IP network, with a mapping being made between Global Titles (and/or destination signalling points) and IP addresses for the purpose of routing the datagrams.

SUMMARY OF THE PRESENT INVENTION

It has been recognised by the inventors of the present invention, that whilst the introduction of IP transport mechanisms at higher levels in the SS7 protocol stack, e.g. directly beneath the TCAP, results in certain advantages, it results in a piecemeal solution where each application or user part, or at least small groupings of application and user parts, require individual IP address mapping tables. In the case of TCAP over IP (or SCCP over IP), non-TCAP (or SCCP) users such as ISUP and TUP do not have access to the IP network.

It is an object of the present invention to overcome or at least mitigate the above noted disadvantage. This and other objects are achieved at least in part by replacing MTP level 2 with the IP based protocol levels.

According to a first aspect of the present invention there is provided a method of transmitting signalling information in a telecommunications network between peer user/application parts, the method comprising:

transferring signalling information from a first user/application part to a Message Transfer Part (MTP) level 3, the information including a destination signalling point identifier identifying the signalling point at which the peer user/application part is located:

determining at the MTP level 3, from said destination signalling point identifier, a destination address suitable for conveying the signalling information to the destination signalling point or to an intermediate signalling point en route to the destination signalling point; and in the event that said destination address is an Internet Protocol (IP) address and port number, transferring the signalling information and the determined IP address and port number to an IP part for transmission over an IP network to the destination or intermediate signalling point.

Embodiments of the present invention enable all user/application parts sharing a common MTP level 3 (e.g. ISUP, TUP. TCAP/SCCP, etc) to also share a common table mapping destination signalling point identifiers to IP addresses and port numbers. Thus, changes in IP routing information (and/or destination signalling point changes) need be reflected only in the single common table, and there is no need to update multiple translation tables.

Preferably, the method of the present invention comprises:

receiving the signalling information transmitted over the IP network at the signalling point identified by said IP address and port number; and passing the signalling information to an MTP level 3 and determining whether or not the signalling point is the destination signalling point on the basis of said destination signalling point identifier included in the signalling information.

Preferably, the method comprises transferring the signalling information to an MTP level 2 in the event that the destination address determined by the MTP level 3 is a signalling link, and transmitting the information to the destination signalling point, or to an intermediate signalling point, over the signalling link.

In the event that the receiving signalling point is the destination signalling point, the signalling information is passed to the peer user/application part. If the receiving signalling point is not the destination signalling point, then the MTP level 3 determines a further destination address, on the basis of the destination signalling point identifier, suitable for conveying the signalling information to the destination signalling point or to another intermediate signalling point. The signalling data may be transmitted to the destination signalling point, or to the next intermediate signalling point, via an IP network as already described or over an alternative network such as an SS7 network (MTP level 2).

Preferably, the method comprises providing a look-up table at the originating signalling point which maps signalling point identifiers to IP addresses and port numbers or to signalling links.

Preferably, the method comprises providing an adaptation level between the MTP level 3 and the IP part, at the originating, intermediate, and destination signalling points.

The adaptation layer "listens" to a predetermined port number to receive and process incoming TCP connections or UDP packets, and provides an interface between the MTP level 3 and the TCP/UDP levels.

The signalling point identifier may comprise a Network Indicator (NI) and a Signalling Point Code (SPC), where the NI identifies a network and the SPC identifies a signalling point within that network. Alternatively, the signalling point identifier may have a Network Indicator plus "Network Identifier—Network Cluster—Network Cluster Member" format (according to the US standard) or some other such format.

According to a second aspect of the present invention there is provided apparatus for transmitting signalling information in a telecommunications network between peer user/application parts, the apparatus comprising:

first processing means implementing a Message Transfer Part (MTP) level 3 for receiving signalling information from a first user/application part, the information including a destination signalling point identifier identifying the signalling point at which the peer user/application part is located, the MTP level 3 determining from said destination signalling point identifier, a destination address suitable for conveying the signalling information to the destination signalling point or to an intermediate signalling point en route to the destination signalling point; and second processing means implementing an IP part for transmitting the signalling information and the determined IP address and port number over an IP network to the destination or intermediate signalling point, in the event that said destination address is an IP address and port number.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION OF CERTAIN EMBODIMENTS

A conventional SS7 protocol stack has already been described with reference to FIG. 1. An alternative to this SS7 transport mechanism will now be described, firstly with reference to FIG. 2 which shows schematically a telecommunications network.

Figure 2:
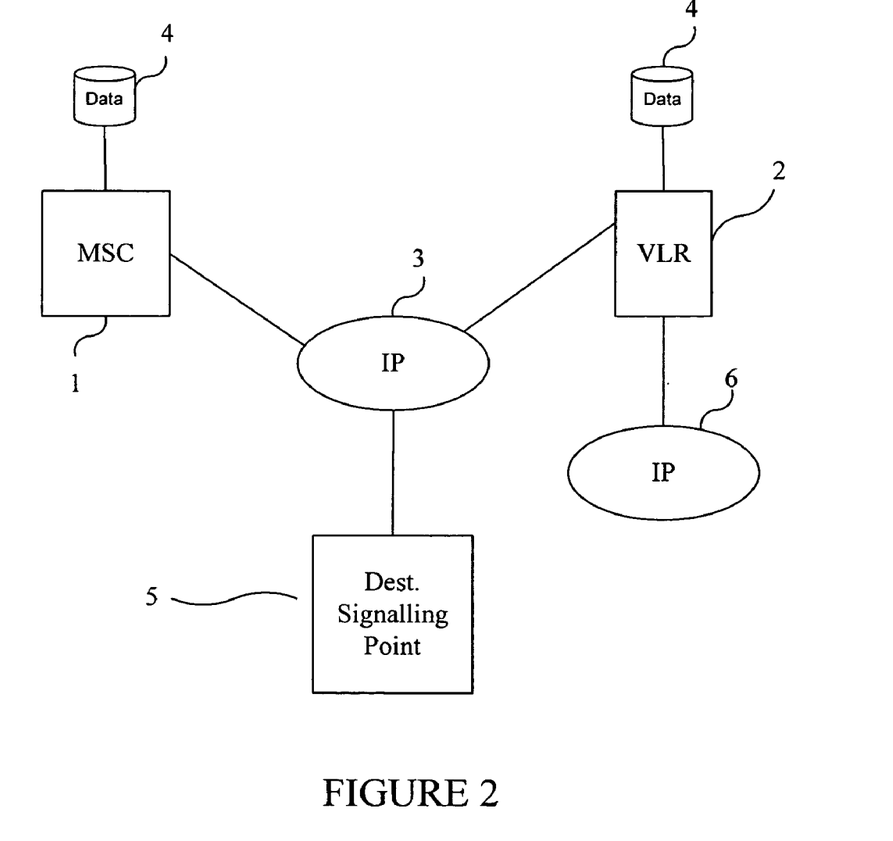
FIG. 2 shows schematically a telecommunications network.

The telecommunications network comprises a first signalling point 1 which, for the purpose of the present example, is a Mobile Switching Centre (MSC) of a PLMN. A second switching point 2 of the PLMN is a Visitor Location Register which maintains a record of mobile subscribers registered with the MSC 1, their status (i.e. on or off), and their current location (i.e. cell). In the event that a call is initiated to a subscriber for whom the MSC 1 is the "home" exchange, before the call can be set up it is necessary for the MSC 1 to exchange certain signalling information with the VLR 2. The form of this information will not be described here in detail, other than to note that it is the Message Application Parts (MAPs) at the MSC 1 and VLR 1 which are the users of the exchanged information, with the MAPs communicating via respective TCAPs and SCCPs.

As will be described below, MAP messages are transported between the MSC 1 and the VLR 2 using an IP network indicated generally by reference numeral 3 in FIG. 2. The IP network may comprise a number of Ethernet links or the like, with intermediate IP routers. In addition to the MSC 1 and the VLR 2, other signalling points may be connected to the same IP network 3 although these are not shown in the Figure.

The role of the MTP level 3 in selecting a signalling link for signalling information in an SS7 network has been described above as being to select a signalling link on the basis of routing information received, in the case of MAP messages, from the SCCP. In Europe, this routing information is typically a signalling point identifier comprising a Network Indicator (NI), a destination Signalling Point Code (SPC) and a Signalling Link Selection (SLS). The MTP level 3 makes use of a look-up (or routing) table to perform the mapping between the signalling point identifiers and signalling links. The look-up table is illustrated in FIG. 2 by a database 4.

For the purposes of transporting signalling information via the available IP network 3, the look-up table used by the MTP level 3 is modified to replace signalling links with IP addresses and port numbers, where respective signalling points are connected to the IP network 3. When an IP address and port number are available for a destination signalling point, the MTP level 3 routes the signalling information (plus address) to a set of protocol levels which effectively replace the MTP levels 1 and 2 of the conventional SS7 protocol stack.

Figure 3:
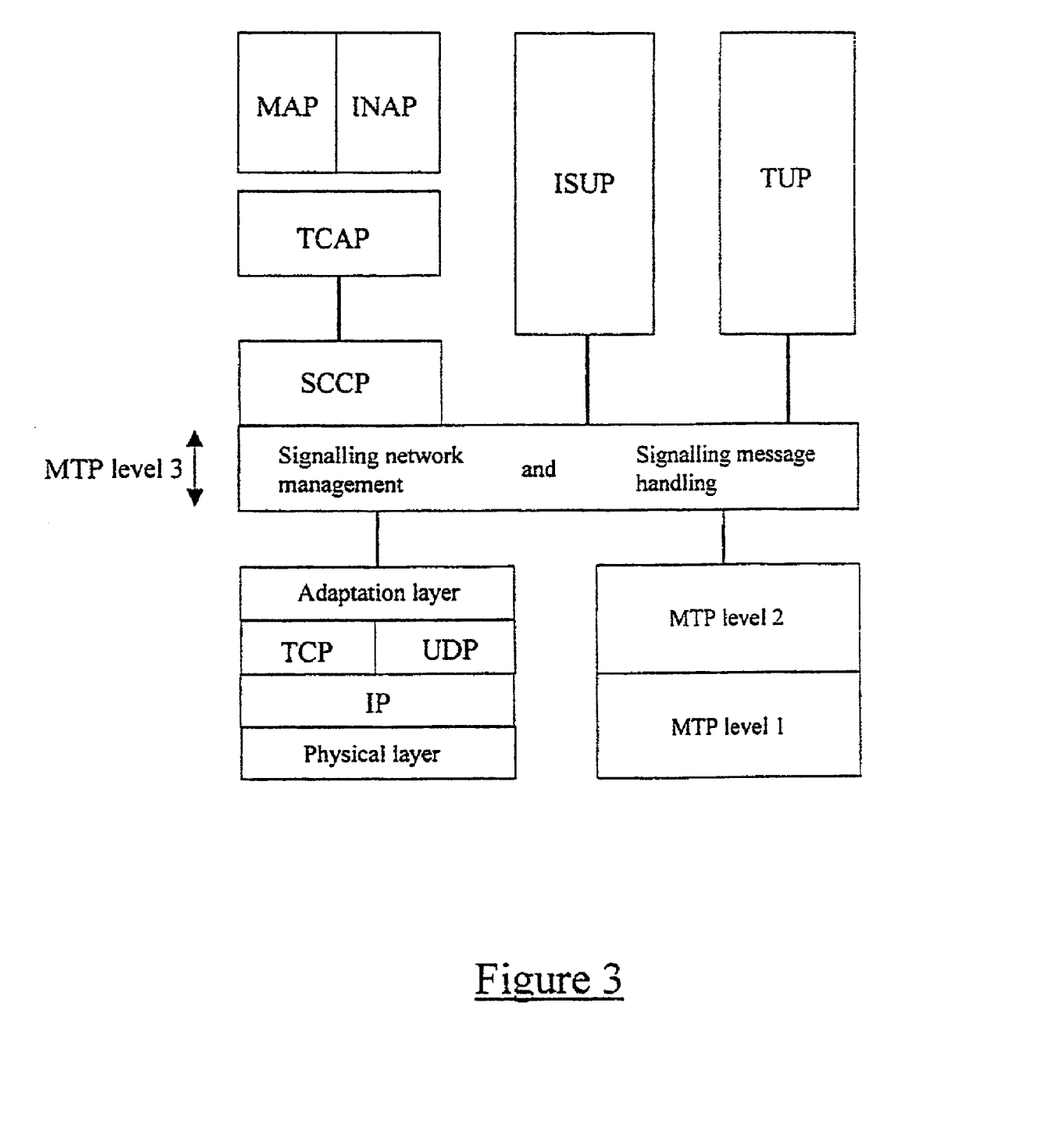
FIG. 3 shows schematically the protocol levels in an IP based signalling information transport mechanism.

These replacement levels include a TCP/UDP layer which is responsible for the encapsulation of the signalling information into datagrams and for ensuring the error free transmission and of the datagrams. Encapsulated datagrams are then passed to an IP level which is responsible for routing the datagrams over the IP network 3 on the basis of the associated IP addresses and port numbers. Beneath the IP level is the physical level which may be Ethernet, X.25, or the like.

An adaptation level is disposed between the MTP level 3 and the TCP/UDP levels and acts as an interface for sending MTP messages to the TCP/UDP level and vice versa. The adaptation layer also listens to a predefined port number to receive and process incoming TCP connections and UDP packets, as well as monitoring the availability of MTP 3 levels at remote signalling points. In the event that an event occurs in the IP network (e.g. the route to a remote signalling point goes down, the TCP connection is dropped, or a new TCP connection has been received), this is signalled to the MTP 3 level by the adaptation layer.

Upon arrival at the signalling point associated with the IP address, i.e. VLR 2, the signalling messages are decapsulated by the TCP or UDP level and are passed to an adaptation layer which is assigned the port number conveyed with the received signalling messages. The adaptation layer passes the messages to an MTP level 3, which confirms that the receiving signalling point is indeed the destination for the messages on the basis of the destination signalling point identifier which accompanies the message. The MTP level 3 then passes the messages to the peer MAP/TCAP via the SCCP level.

In some cases, a destination signalling point for a signalling message may not be connected to the IP network 3, such that it is necessary to route signalling messages via an intermediate signalling point. This is illustrated in FIG. 2, where signalling point 2 is now considered as an intermediate signalling point whilst signalling point 5 is the destination signalling point.

In this case, the IP address and port number returned by the database 4 at the MSC 1 identify the intermediate signalling point 2. Upon receipt of a message at the intermediate signalling point 2, the message is decapsulated at the TCP or UDP level and is passed to the MTP level 3 via the adaptation layer. From the destination signalling point identifier contained in the message, the MTP level 3 determines that the intermediate signalling point 2 is not the destination signalling point and accordingly selects a destination address appropriate to the actual destination signalling point 5, using a database 4 associated with the receiving signalling point 2.

Assuming that a second IP network 6 connects the intermediate signalling point 2 to the actual destination signalling point 5, then the database query returns an IP address and port number associated with the destination signalling point 5.

It may alternatively be the case that a destination/intermediate signalling point is not connected to the originating signalling point via the IP network 3 (either directly or indirectly via an intermediate signalling point), but rather by a conventional SS7 network. In this case, when the MTP level 3 at the originating signalling point queries the database 4 with the destination signalling point identifier, a signalling link is returned (rather than an IP address and port number). The MTP level 3 then directs the signalling information to the MTP level 2 (illustrated in FIG. 3), for transport over the SS7 network. Similarly, an intermediate signalling point may have the option of directing signalling information over an IP network or an SS7 network, depending upon availability.

Figure 4A:
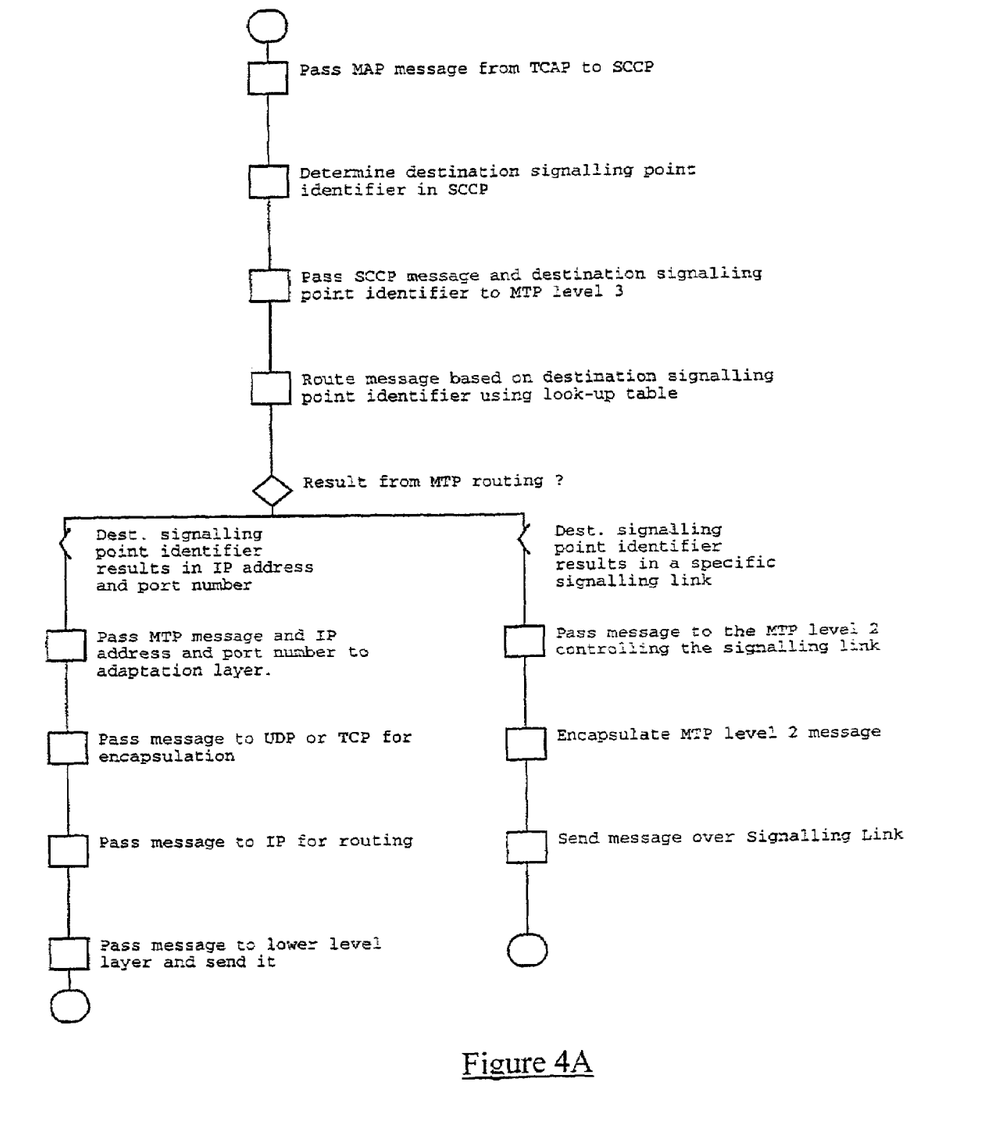
FIG. 4A is a flow diagram illustrating the process of transmitting signalling messages from a signalling point of the network of FIG. 2.
Figure 4B:
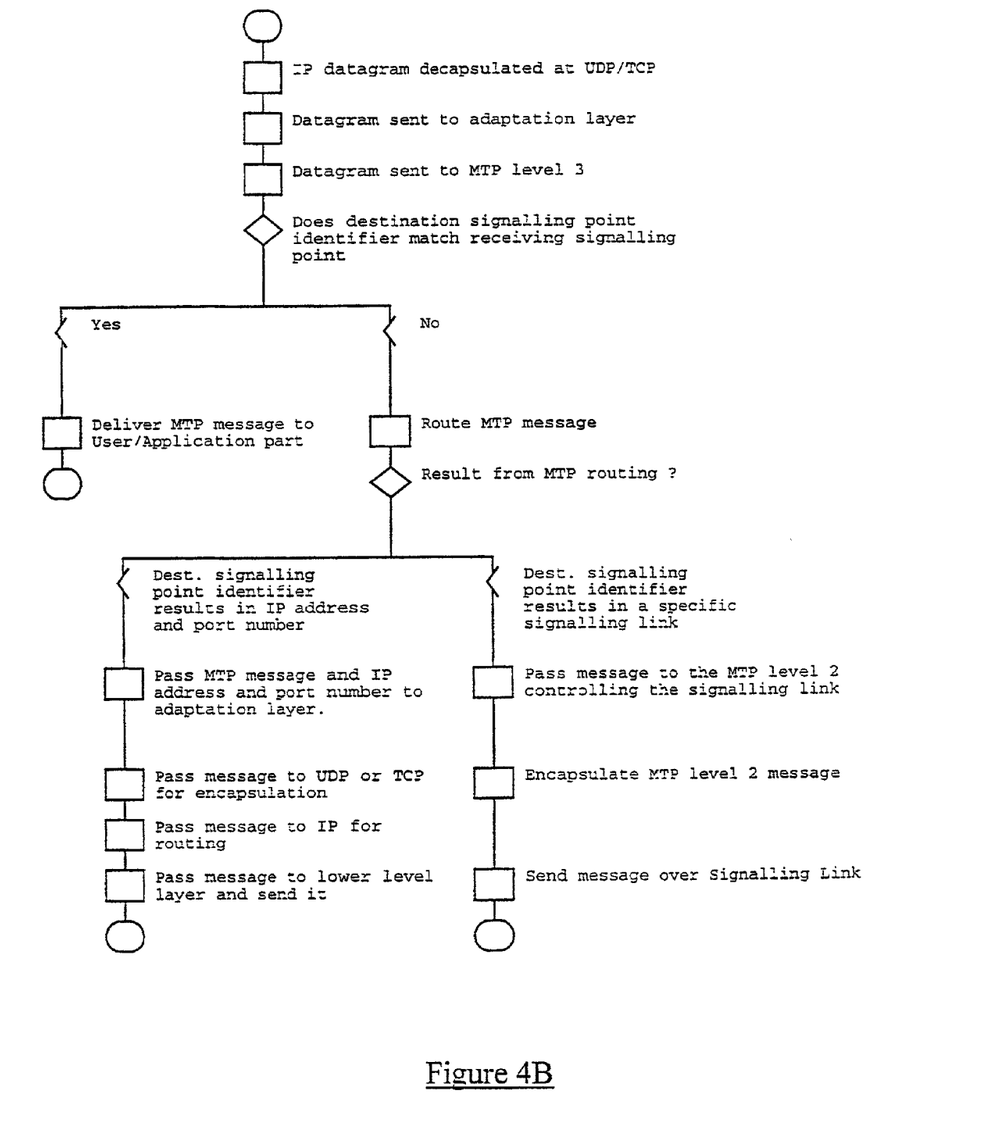
FIG. 4B is a flow diagram illustrating the process of receiving signalling messages at a signalling point of the network of FIG. 2.

FIG. 4A is a flow diagram illustrating the process of transmitting a signalling message over an IP network to a signalling point, whilst the flow diagram of FIG. 4B illustrates the process of receiving a signalling message at a signalling point.

It will be appreciated by the person of skill in the art that various modifications may be made to the above described embodiment without departing from the scope of the present invention. For example, whilst the above description has been concerned with the transmission of MAP messages, the invention is also applicable to the transmission of other signalling messages which make use the MTP level 3 e.g. ISUP, TUP, etc.

The invention claimed is:

1. A method of transmitting signalling information in a telecommunications network between peer user/application parts, the method comprising:

transferring signalling information from a first user/application part to a Message Transfer Part (MTP) level 3, the information including a destination signalling point identifier identifying the signalling point at which a peer user/application part is located;

determining at the MTP level 3, from said destination signalling point identifier, a destination address suitable for conveying the signalling information to the destination signalling point or to an intermediate signalling point en route to the destination signalling point;

providing an adaptation layer between the MTP level 3 and the IP part at the originating signalling point, as well as at intermediate and destination signalling points, the adaptation layer providing an interface between the MTP level 3 and TCP/UDP levels and listening to a predetermined port number to receive and process incoming TCP connections or UDP packets; and in the event that said destination address is an Internet Protocol (IP) address and port number transferring, via the adaptation layer, the signalling information and the determined IP address and port number to an IP part for transmission over an IP network to the destination or intermediate signalling point.

2. A method according to claim 1 and comprising transferring the signalling information to an MTP level 2 in the event that the destination address determined by the MTP level 3 is a signalling link, and transmitting the information to the destination signalling point, or to an intermediate signalling point, over the signalling link.

3. A method according to claim 1 and comprising:
receiving the signalling information transmitted over the IP network at the signalling point identified by said IP address and port number; and
passing the signalling information via the adaptation layer to the MTP level 3 and determining whether or not the signalling point is the destination signalling point on the basis of said destination signalling point identifier included in the signalling information.

4. A method according to claim 3 and comprising passing the signalling information to the peer user/application part in the event that the receiving signalling point is the destination signalling point.

5. A method according to claim 3 and comprising determining at the MTP level 3 a further destination address, on the basis of the destination signalling point identifier, suitable for conveying the signalling information to the destination signalling point or to another intermediate signalling point, if the receiving signalling point is not the destination signalling point.

6. A method according to claim 1 and comprising providing a look-up table at a transmitting signalling point, which table maps signalling point identifiers to IP addresses and port numbers or to signalling links.

7. A method according to claim 1, wherein the adaptation layer monitors the availability of MTP 3 levels at remote signalling points and reports network events to the associated MTP 3 level.

8. A method according to claim 1, wherein the signalling point identifier comprises a Network Indicator (NI) and a Signalling Point Code (SPC), where the NI identifies a network and the SPC identifies a signalling point within that network.

9. A method according to claim 1, wherein the signalling point identifier has a Network Indicator plus "Network Identifier—Network Cluster—Network Cluster Member" format.

10. Apparatus for transmitting signalling information in a telecommunications network between peer user/application parts, the apparatus comprising:

first processing means implementing a Message Transfer Part (MTP) level 3 for receiving signalling information from a first user/application part, the information including a destination signalling point identifier identifying the signalling point at which a peer user/application part is located, the MTP level 3 determining from said destination signalling point identifier, a destination address suitable for conveying the signalling information to the destination signalling point or to an intermediate signalling point en route to the destination signalling point;

second processing means implementing an IP part for transmitting the signalling information and the determined IP address and port number over an IP network to the destination or intermediate signalling point, in the event that said destination address is an IP address and port number; and an adaptation layer between the MTP level 3 and the IP part at the originating, intermediate and destination signaling points, the adaptation layer providing an interface between the MTP level 3 and Transmission Control Protocol/User Datagram Protocol (TCP/UDP) levels and listening to a predetermined port number to receive and process incoming TCP connections or UDP packets.

* * * * *

UNITED STATES PATENT AND TRADEMARK OFFICE
CERTIFICATE OF CORRECTION

| | | |
|---|---|---|
| PATENT NO. | : 7,054,326 B1 | Page 1 of 1 |
| APPLICATION NO. | : 09/857047 | |
| DATED | : May 30, 2006 | |
| INVENTOR(S) | : Garcia-Martin et al. | |

It is certified that error appears in the above-identified patent and that said Letters Patent is hereby corrected as shown below:

On the Title Page, in Item (73), under "Assignee", in Column 1, Line 1, delete "Telefonakitebolaget" and insert -- Telefonaktiebolaget --, therefor.

On the Title Page, in Item (56), under "U.S. PATENT DOCUMENTS", in Column 2, Line 4, delete "6,411,632 B1" and insert -- 6,411,632 B2 --, therefor.

On the Title Page, in Item (56), under "OTHER PUBLICATIONS", in Column 2, Line 1, delete "E." and insert -- R. --, therefor.

On the Title Page, in Item (57), under "ABSTRACT", in Column 2, Line 11, delete "Port" and insert -- port --, therefor.

Signed and Sealed this

Eighteenth Day of December, 2007

JON W. DUDAS
*Director of the United States Patent and Trademark Office*